United States Patent [19]

Hirose

[11] Patent Number: 5,639,038

[45] Date of Patent: Jun. 17, 1997

[54] FISHING REEL WITH A LINE TENSION MEASURING DEVICE

[75] Inventor: Haruomi Hirose, Tokyo, Japan

[73] Assignee: Daiwa Seiko, Inc., Tokyo, Japan

[21] Appl. No.: 539,786

[22] Filed: Oct. 5, 1995

[30] Foreign Application Priority Data

Oct. 5, 1994  [JP]  Japan .................................. 6-241494

[51] Int. Cl.[6] .................................................. A01K 89/015
[52] U.S. Cl. .................... 242/223; 242/261; 73/862.391; 73/862.333
[58] Field of Search ........................... 242/223, 259, 242/260, 261; 73/862.191, 862.321, 862.333, 862.391, 862.56

[56] References Cited

U.S. PATENT DOCUMENTS

| | | | |
|---|---|---|---|
| 3,289,473 | 12/1966 | Louda | 73/862.333 |
| 4,790,492 | 12/1988 | Atobe | 242/223 |
| 5,219,131 | 6/1993 | Furomoto | 242/223 |
| 5,313,845 | 5/1994 | Hayashi et al. | 73/862.333 |
| 5,395,065 | 3/1995 | Hirose | 242/223 |
| 5,427,323 | 6/1995 | Kaneko et al. | 242/223 |
| 5,465,627 | 11/1995 | Garshelis | 73/862.333 |

FOREIGN PATENT DOCUMENTS

| | | |
|---|---|---|
| 58-9034 | 1/1983 | Japan . |
| 59-166827 | 9/1984 | Japan . |
| 4-276510 | 10/1992 | Japan . |

*Primary Examiner*—Katherine Matecki
*Attorney, Agent, or Firm*—Sughrue, Mion, Zinn, Macpeak & Seas

[57] ABSTRACT

The invention concerns a fishing reel including a line tension measuring device which is capable of adjusting a drag force properly. In the line tension measuring device, magnetostrictive magnetic thin bands are bonded to the outer periphery of a spool shaft, a coil is provided in such a manner that it is opposed to the magnetic thin bands, variations in the permeabilities of the respective magnetostrictive thin bands caused by variations in the tension of a fishline are measured as variations in the induced voltage of the coil, the values of the measured variations are converted to the line tensions, and the line tensions are displayed on the display portion of the line tension measuring device.

7 Claims, 9 Drawing Sheets

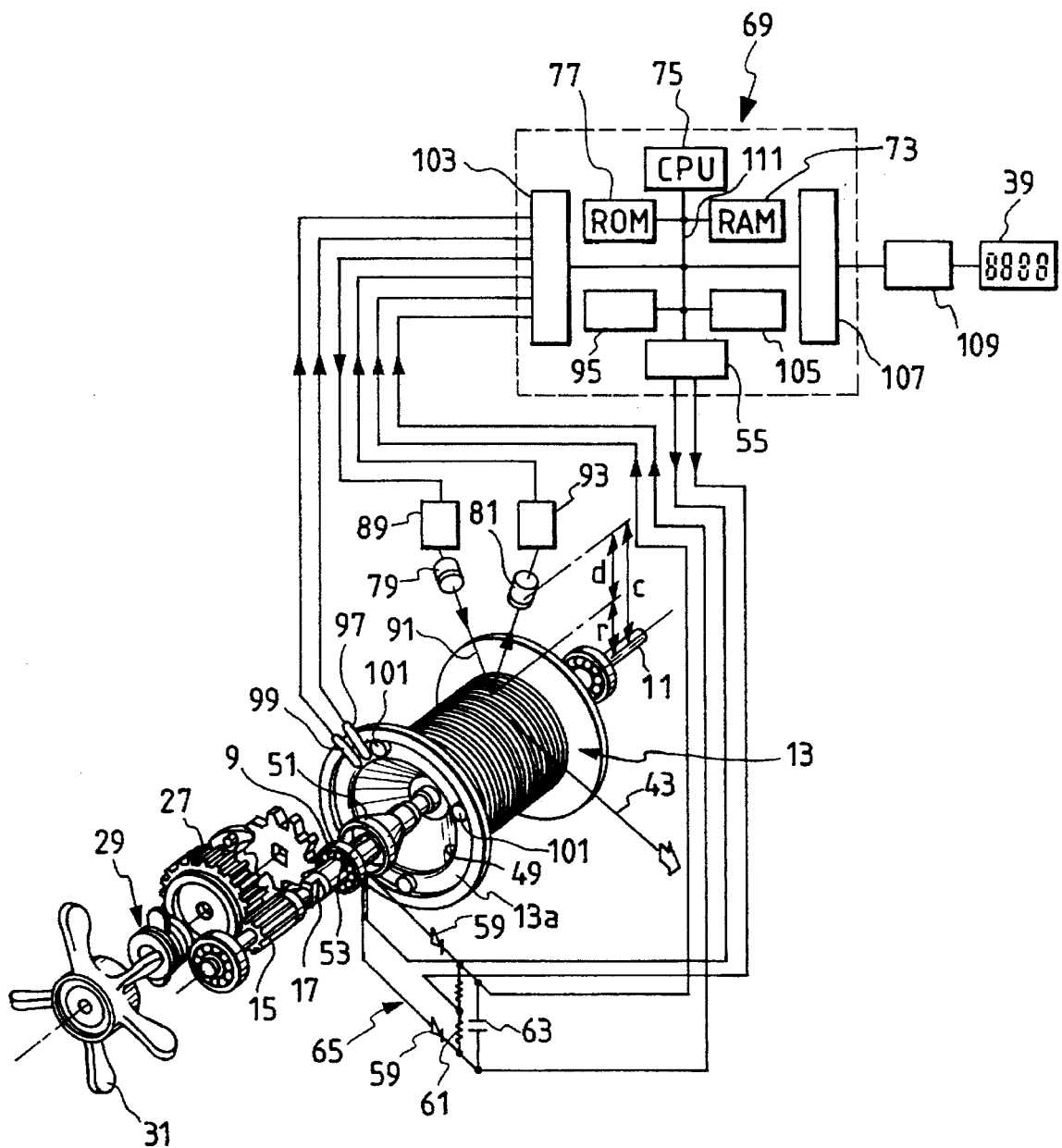

FISHING REEL WITH A LINE TENSION MEASURING DEVICE

BACKGROUND OF THE INVENTION

The present invention relates to a fishing reel with a line tension measuring device.

Generally, in a fishing reel such as a double bearing type reel, a spinning reel and the like, there is mounted a drag device which is used to prevent a fishline from being cut while an angler is fighting against the fish.

The drag device is structured such that, when a great tensile force is given to a fishline due to the strong pulling by the fish, the drag device plays out the fishline by rotating a spool forcibly in a fishline play-out direction while controlling the spool frictionally according to the tension force, thereby preventing the fishline from being cut. The drag device can be produced by combining together a drag washer, a lining washer, a compression spring and the like.

The strength of the drag force of the drag device can be adjusted according to the diameters of a fishline to be used and to the strength of the pulling forces of the expected target fish by operating a star drag (drag knob) mounted on the reel main body to thereby control its fastening force with respect to the above-mentioned washers.

However, conventionally, in the fishing reel of this kind, since it does not include preferable means for measuring the fishline tension during the fighting operation, it is not possible to judge the actual tension applied to the fishline, and the scale of the drag device, which displays the strength of the drag force of the drag device, can display only the drag force but cannot judge the tensile force applied to the fishline.

Also, since the adjustment of the drag force by the star drag is made based on experience according to the diameters of the fishline and the target fish, it is impossible to recognize whether the drag force is set within the allowable tension of the fishline or not and, generally, the drag force cannot be set in the right values. As a result of this, there is a possibility that the fishline can be cut frequently during the fighting operation.

Therefore, the less experienced an angler is, the thicker fishline the angler uses. When a thick fishline is used, then the fish is cautious and does not bite well. Also, since a rather large reel must be used to wind the thick fishline, the reel is increased in weight. If the fishline tension when landing the fish is displayed correctly, then the drag device can be operated properly and, therefore, even the beginner can use and wind a thin fishline around a small-size reel, thereby being able to improve convenience for use of the fishing reel.

Now, conventionally, there is disclosed in Japanese Patent Publication No. 58-9034 of Showa a torque sensor in which an amorphous magnetic thin band having a large magnetic strain constant is wound around and fixed to a rotary shaft and a torque can be detected in a non-contact manner by making use of the fact that the magnetic property of the amorphous magnetic thin band is caused to vary according to torques applied to the rotary shaft. Also, in Japanese Patent Publication No. 59-166827 of Showa, there is disclosed a magnetostrictive torque sensor of a differential system which comprises: a round-rod-shaped shaft for transmitting a torque; two kinds of rectangular magnetostrictive magnetic thin bands respectively fixed to the outer peripheral surface of the round-rod-shaped shaft in such a manner that one band forms a positive angle with respect to the axial direction of the round-rod-shaped shaft while the other forms a negative angle; and, electric coil means provided in the neighborhood of the outer peripheral surface of the round-rod-shaped shaft for detecting a difference between the magnetic permeabilities of the two kinds of magnetostrictive magnetic thin bands that are caused to vary according to torques to be applied to the round-rod-shaped shaft.

Besides, Japanese Patent Publication No. 4-276510 of Heisei proposes a line length measuring device for a fishing reel which finds the line winding diameter of a spool varying according as a fishline is played out from or taken up around the spool, operates the play-out length of the fishline based on the line winding diameter of the spool, and allows a display portion to display the operated fishline play-out length. It is possible to find the tension of the fishline by calculation with the use of both the line winding diameter of the spool obtained in the above manner and the torque of the spool shaft measured in the above-mentioned torque sensors.

SUMMARY OF THE INVENTION

In view of the above-mentioned environment of the prior art, it is an object of the invention to provide a fishing reel equipped with a line tension measuring device, which is developed by applying the above-mentioned prior art to a fishing reel, to measure and display the tension of a fishline to thereby be able to adjust a drag force to a proper value.

In attaining the above object, according to the invention, there is provided a fishing reel with a line tension measuring device for measuring fishline tension applied to a fishline wound onto a spool, the spool being rotatably supported on a reel main body through a spool shaft and braked by a drag force provided by a drag device, the line tension measuring device comprising:

a magnetostrictive torque sensor including:
  a pair of magnetostrictive magnetic thin bands bonded to an outer periphery of the spool shaft for providing respective magnetic permeabilities varying according to torque caused on the spool shaft due to the fishline tension; and
  coil means, provided around the outer periphery of the spool shaft, for exciting the spool shaft by being supplied with a high frequency current from an oscillating circuit, to allow a magnetic flux to permeate therethrough, and detecting a difference between the magnetic permeabilities of the magnetostrictive magnetic thin bands, to thereby provide an induced voltage;

line winding diameter measuring means for measuring a line winding diameter of the fishline wound on the spool;

conversion means for converting the induced voltage into a calculated shaft torque;

operation means for providing a calculated fishline tension based on the calculated shaft torque obtained by the conversion means and the spool line winding diameter measured by the line winding diameter measuring means; and, a display device for displaying the calculated fishline tension obtained by the operation means.

In an embodiment, a fishing reel comprises a spool rotatably supported through a spool shaft on a reel main body, a clutch mechanism for switching the spool between a fishline take-up state and a fishline play-out state, and a drag device for applying a drag force to the spool, the fishing reel further including a line tension measuring device which comprises: a magnetostrictive torque sensor including magnetostrictive magnetic thin bands respectively bonded to the outer periphery of the spool shaft and each having a magnetic permeability variable according to torques to be applied to the spool shaft, coil means disposed in the neighborhood of the outer periphery of the spool shaft, the coil means including an exciter coil means for exciting the spool shaft to allow a magnetic flux to permeate therethrough and a detector coil means for detecting a difference between the magnetic permeabilities of the magnetostrictive magnetic thin bands caused by a variation in the fishline tension, and an oscillation circuit for supplying a high frequency current to the exciting coil means; line winding diameter measuring means for measuring the line winding diameter of the spool as the fishline is played out from and taken up around the spool; conversion means for converting the induced voltage of the detect coil means into a shaft torque; operation means for operating a line tension from the shaft torque obtained by the conversion means and the line winding diameter of the spool measured by the line winding diameter measuring means; and, a display device for displaying the value of the line tension operated by the operation means.

According to the fishing reel, if a tension is applied to the fishline and a shaft torque is thereby produced in the spool shaft, then the magnetostrictive magnetic thin bands of the magnetostrictive torque sensor included in the line tension measuring device are strained to thereby cause a DC voltage to occur in the detect coil means.

And, the conversion means converts the DC voltage into a shaft torque, the operation means operates a line tension from the thus converted shaft torque and the line winding diameter of the spool measured by the line winding diameter measuring means, and the display device displays the value of the thus operated line tension.

In the fishing reel according to the present invention, a spool shaft and bearings for supporting the spool shaft rotatably on a reel main body are respectively formed of stainless steel, magnetostrictive magnetic thin bands are bonded to the outer periphery of the spool shaft almost in the middle between the spool and clutch mechanism, a recess-like coil storage portion is formed in the side surface of the spool on the clutch mechanism side with the spool shaft as the center thereof, a yoke formed in conformity with the shape of the coil storage portion is disposed in the coil storage portion in such a manner that it is opposed to the spool shaft with a slight clearance between them, and the exciter and detector coils are mounted on the yoke.

The exciter and detector coils are mounted into the coil storage portion through the yoke and the detector coil detects the strain of the magnetostrictive magnetic thin bands.

BRIEF DESCRIPTION OF THE DRAWINGS

FIG. 8 is a perspective view and a circuit diagram of the main portions of the present fishing reel, showing the principles for measuring a shaft torque.

DETAILED DESCRIPTION OF THE PREFERRED EMBODIMENT

Now, description will be given below in detail of an embodiment of a fishing reel according to the invention with reference to the accompanying drawings.

Figure 1:
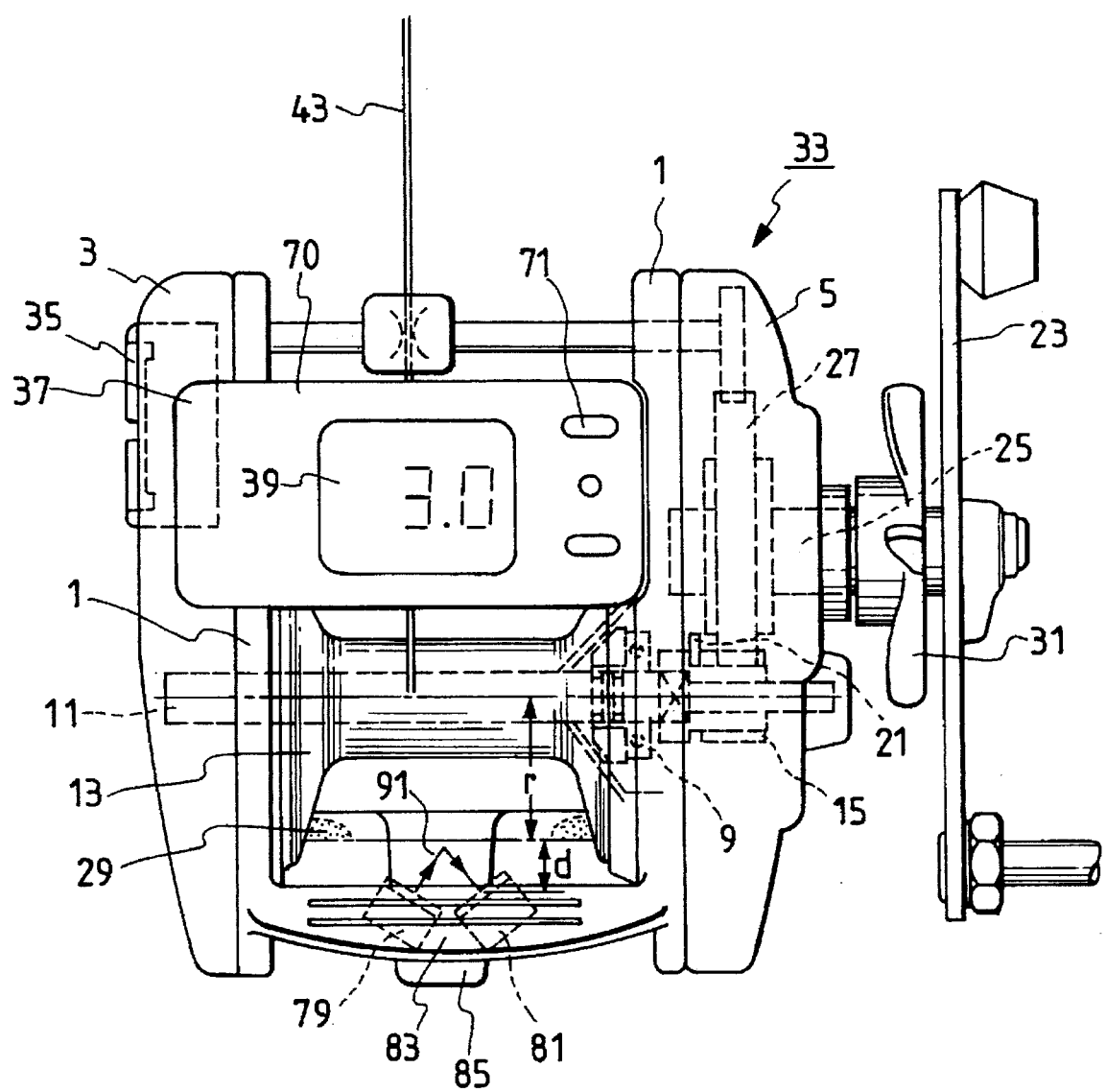
FIG. 1 is a plan view of an embodiment of a fishing reel including a fishline tension measuring device according to the invention.
Figure 2:
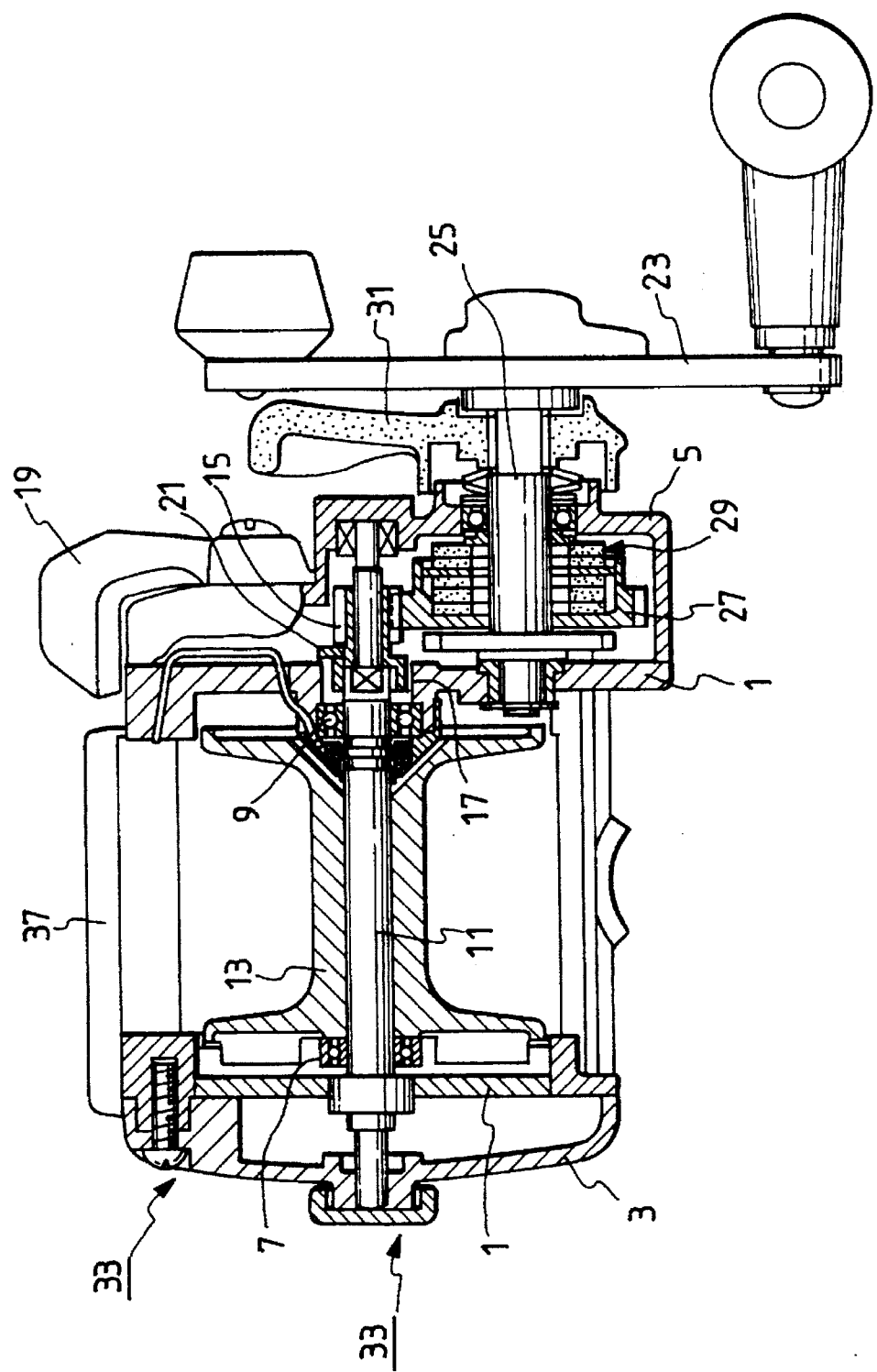
FIG. 2 is a partially cutaway front view of the fishing reel shown in FIG. 1.

FIG. 1 is a plan view of an embodiment of a fishing reel according to the invention, and FIG. 2 is a partially cutaway front view of the above fishing reel. In these figures, reference character 1 designates a reel main body including left and right side portions to which side plates 3 and 5 are respectively mounted. Bearings 7 and 9 are also mounted to the reel main body 1, and a spool 13 is rotatably supported on the bearings 7 and 9 through a spool shaft 11. Here, the bearing 9 located within the side plate 5, and the spool shaft 11 are respectively formed of stainless steel.

And, on the spool shaft 11 which projects into the side plate 5, there is mounted a pinion gear 15 in such a manner that it is rotatable with respect to the spool shaft 11 and is slidable in the axial direction thereof. A clutch 17, which can be engaged with and disengaged from the spool shaft 11, is formed integral with the pinion gear 15. If a clutch lever 19 mounted on the side plate 5 is operated, then a clutch plate 21 secured to the clutch 17 engages or disengages the clutch 17 (pinion gear 15) with or from the spool shaft 11, thereby switching the spool 13 between a fishline play-out state (clutch OFF) and a fishline take-up state (clutch ON).

Also, in the drawings, reference character 23 designates hand-operated handle including a handle shaft 25 on which a drive gear 27 in mesh with the pinion gear 15 is mounted rotatably with respect to the handle shaft 25. The rotational force of the hand-operated handle 23 can be transmitted through the drive gear 15, the pinion gear 25 and the spool shaft 11 to the spool 13. And, as described above, if the clutch lever 19 is operated, then the rotational force of the hand-operated handle 23 is selectively transmitted to the spool 13.

And, the drive gear 27 is frictionally connected to the handle shaft 25 by a well-known drag device 29 and thus, similarly to the prior art, the drag force of the drag device 29 can be adjusted by a star drag 31 which is rotatably mounted on the handle shaft 25.

Accordingly, a fishing reel 33 according to the present embodiment includes not only a structure similar to the before-mentioned conventional structure but also, as the characteristic structure thereof, a line tension measuring device for measuring a line tension applied to the fishline and a line length measuring device for measuring the play-out line length of the fishline.

Figure 3:
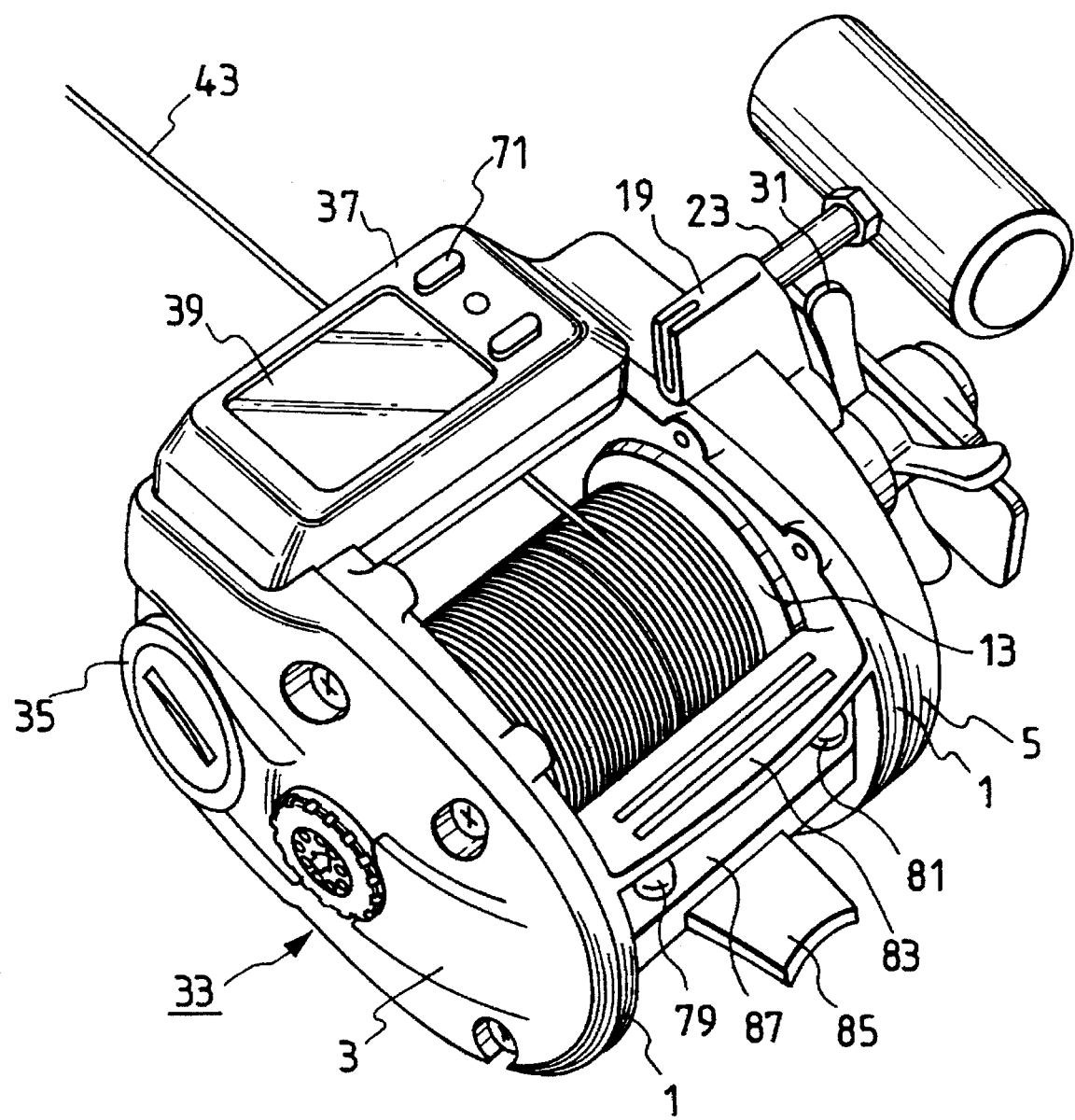
FIG. 3 is a perspective view of the whole fishing reel shown in FIG. 1.
Figure 4:
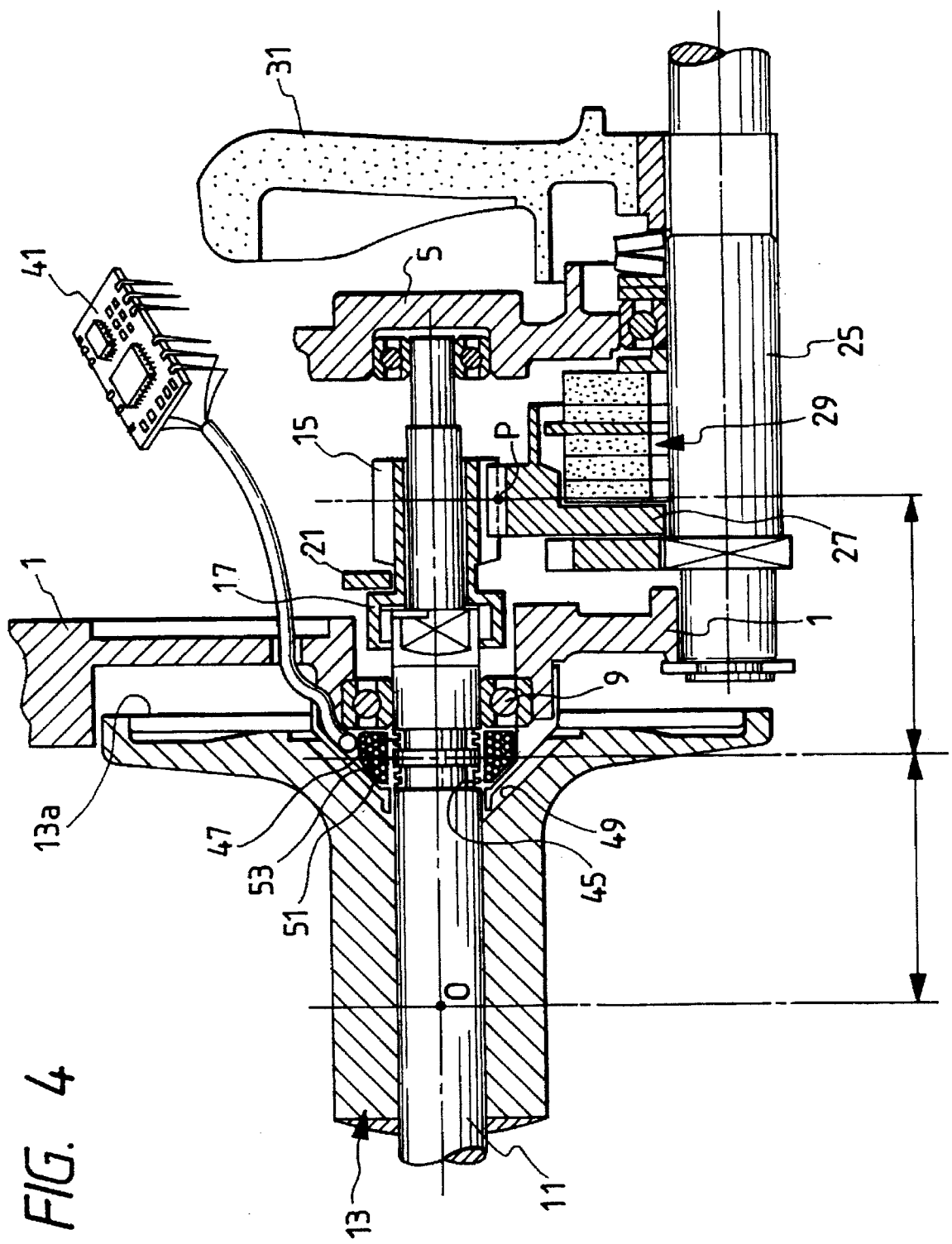
FIG. 4 is a section view of the main portions of an embodiment of a magnetostrictive torque sensor employed in the invention.

That is, as shown in FIG. 3, to the side plate 3 and the top front portion of the reel main body 1, there are assembled a battery case 35 and an IC module 37 which are respectively made waterproof. In the IC module 37, there are stored an LCD display device 39 and a circuit board 41 which is shown in FIG. 4. The line tension and play-out line length of a fishline 43 respectively measured by the line tension measuring device and line length measuring device can be displayed on the LCD display device 39.

Figure 5:
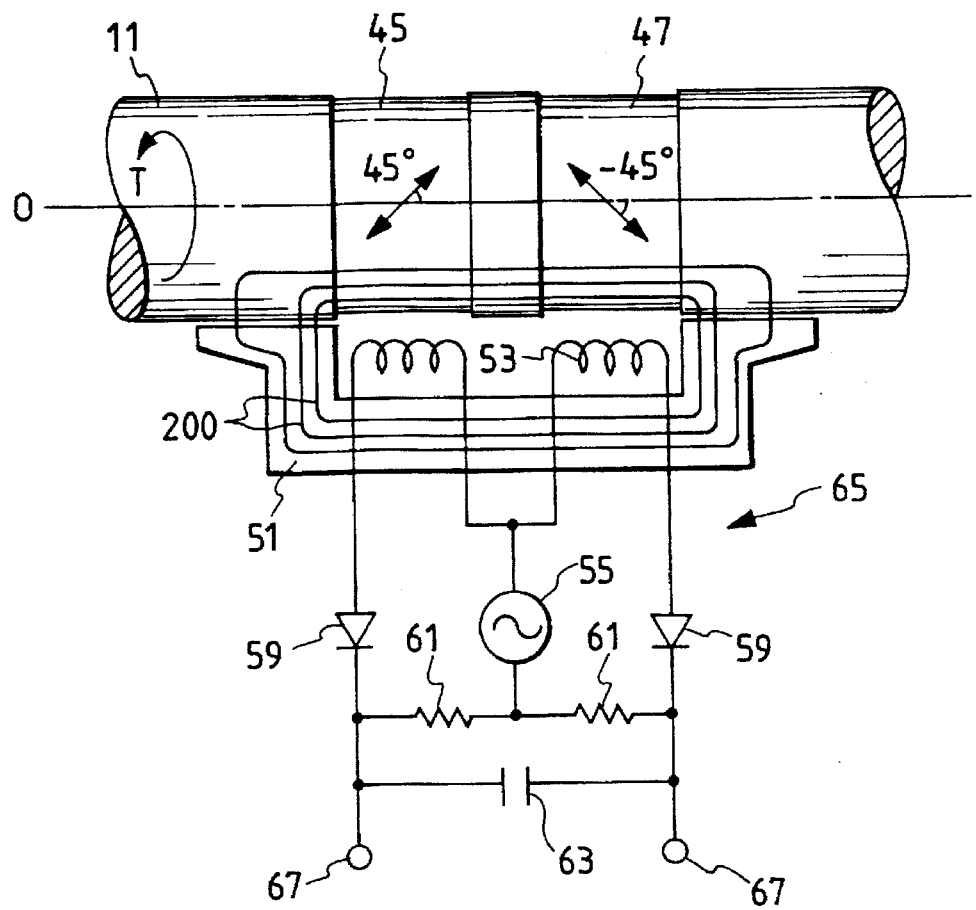
FIG. 5 is an explanatory view of the principles of the magnetostrictive torque sensor.

Now, FIG. 4 shows a mounting structure of a magnetostrictive torque sensor which forms the line tension measuring device and, in FIG. 4, reference characters 45 and 47 respectively designate the magnetostrictive magnetic thin bands (which will be hereinafter referred to as magnetic thin bands) that are disclosed in Japanese Patent Publication No. 59-166827 of Showa, and the magnetic thin bands 45 and 47 are respectively bonded to the outer periphery of the spool shaft 11. And, as shown in FIG. 5, the magnetic thin bands 45 and 17 are respectively given uniaxial magnetic anisotropy in the directions of 45° and −45° with respect to the central axis of the spool shaft 11, and they are disposed such that one magnetic thin band of 45° and the other of −45° can be operated differentially.

Thus, generally, when the spool 13 is set in a fishline take-up state, as shown in FIG. 4, the intermeshing portion between the pinion gear 15 and drive gear 27 provides a fulcrum P for restricting the rotation of the spool 13 and, if a line tension is applied to the fishline 43, then the spool shaft 11 is twisted in the substantially middle portion between the spool 13 and the fulcrum P. Therefore, the magnetic thin bands 45 and 47 are bonded to the outer periphery of the spool shaft 11 along the clutch side surface 13a of the spool 13 which is the substantially middle portion between the spool 13 and the fulcrum P for restricting the rotation of the spool 13. More specifically, as shown in FIG. 4, the magnetic thin bands 45 and 47 are preferably located substantially at a midpoint between a point O corresponding to an axial center of the spool 13 and a point P at which the pinion gear 15 fitted on the spool shaft 11 meshes with the drive gear 27 to which the drag force is applied.

Figure 6A:
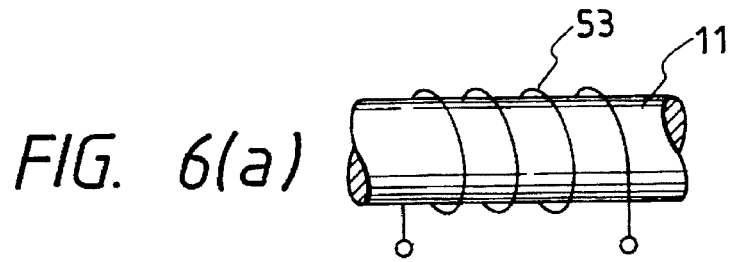
FIGS. 6(a) and 6(b) are explanatory views of a simplified display method for a coil.

Also, in FIG. 4, 49 designates a substantially conical coil storage portion which is formed in the clutch side surface 13a of the spool 13 with the spool shaft 11 as the center thereof. A yoke 51, which is formed into a conical shape in conformity with the shape of the coil storage portion 49, is disposed in the coil storage portion 49 in such a manner that it is opposed to the spool shaft 11 with a slight clearance (0.15 mm) between them. And, a coil 53, which can be used not only as an exciter coil but also as a detector coil, is wound within the yoke 51 such that, as shown in FIG. 6(a), it is disposed adjacent to the outer periphery of the spool shaft 11. In addition, the yoke 51 is attached and fixed to a portion of the reel main body 1 supporting the spool shaft 11 passing therethrough.

As described above, the present embodiment is characterized in that the coil storage portion 49 is formed in the clutch side side surface 13a of the spool 13 and the coil 53 is mounted into the coil storage portion 49 through the yoke 51. In other words, to apply the magnetostrictive torque sensor disclosed in Japanese Patent Publication No. 59-166827 of Showa to a fishing reel, the magnetic thin bands 45, 47 and coil 53 must be made far smaller in size than the conventional magnetic thin bands and coil.

Therefore, in the present embodiment, in order to be able to obtain an induced voltage necessary to operate the circuit board 41, as described above, the distance between the yoke 51 and spool shaft 11 is set for 0.15 mm. In order to make effective use of the narrow space, the conically shaped coil storage portion 49 is formed in the clutch side side surface 13a of the spool 13 and the yoke 51 is similarly formed in a conical shape so as to be able to obtain the necessary number of windings of the coil 53.

Also, in the present embodiment, the bearing 9 is formed of stainless steel which allows the magnetic fluxes to pass therethrough and the bearing 9 is added to part of the magnetic path to thereby be able to secure a wide storage space for the coil 53.

Figure 6B:
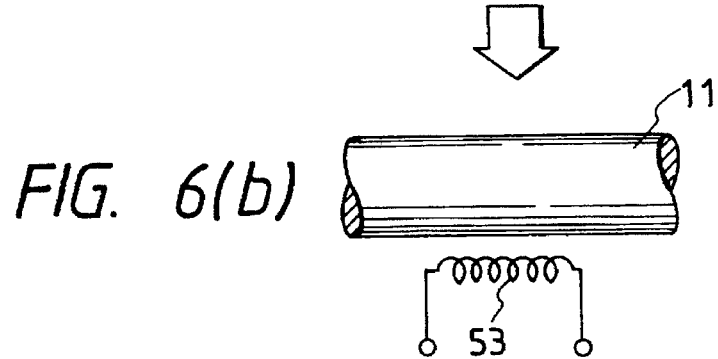

Now, FIGS. 6(a) and 6(b) show a simple coil expression method, in which the cylindrical coil 53 wound adjacently to the outer periphery of the spool shaft 11 shown in FIG. 6(a) is expressed by a simplified coil 53 shown in FIG. 6(b).

Figure 7:
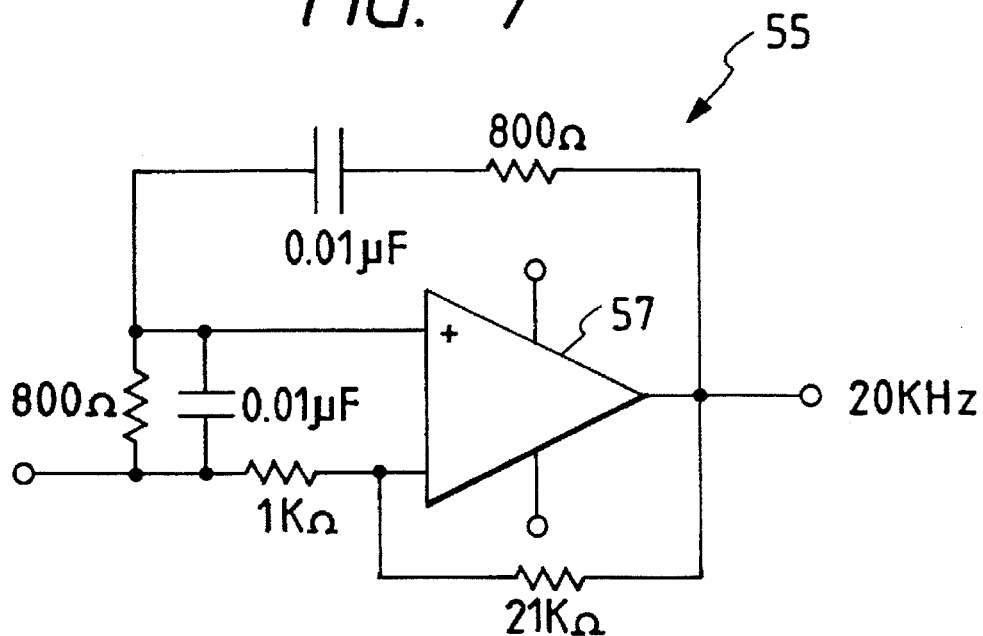
FIG. 7 is a circuit diagram of an embodiment of an oscillation circuit.

Also, in FIG. 5, 55 stands for an oscillation circuit which supplies an exciting current of 20 KHz to the coil 53. The oscillation circuit 55, as shown in FIG. 7, is an RC oscillation circuit which uses an operational amplifier 57 and it supplies an exciting current with an oscillation frequency of 20 KHz which can produce a difference between the magnetic permeabilities of the magnetic thin bands 45 and 47.

Thus, if the exciting current of 20 KHz is supplied to the coil 53, then magnetic fluxes 200 are generated and interlinked with the magnetic thin bands 45 and 47. And, if the exciting current is increased beyond the magnetic wall moving and magnetizing process of the magnetic thin bands 45 and 47, then there is produced a difference between the magnetic permeabilities of the magnetic thin bands 45 and 47 and a magnetic flux proportional to the difference between the magnetic permeabilities is interlinked with the coil 53, so that there is generated an induced voltage corresponding to the torque of the spool shaft 11. The induced voltage is rectified into a DC voltage by a rectifier circuit which is composed of a diode 59, a resistor 61, and a capacitor 63, and the DC voltage is then output to the circuit board 41 from the output terminals 67 of a magnetostrictive torque sensor 65.

And, in the circuit board 41, as shown in FIG. 8, a microcomputer 69 detects the DC voltage and performs a given operation processing, and the resultant value is displayed on the LCD display device as the line tension value.

That is, as shown in FIG. 1, a line tension display switch 71 is provided on an operation panel 70 disposed on the IC module 37 and, if the line tension display switch 71 is operated, then the oscillation circuit 55 is turned on and supplies the exciting current of 20 KHz to the coil 53. As a result of this, as shown in FIG. 5, the magnetic flux of 20 KHz is allowed to pass through a magnetic path which is composed of the spool shaft 11, bearing 9 and yoke 51.

During this operation, as shown in FIG. 5, if a shaft torque T is applied to the spool shaft 11 to thereby apply stresses to the magnetic thin bands 45 and 47 so that the thin bands 45 and 47 are strained, then a DC voltage V proportional to the intensity of the shaft torque T appears between the output terminals 67 and the value of the DC voltage is stored into a RAM 73 included in the microcomputer 69. And, a CPU 75 calculates the shaft torque T from the DC voltage V according to a calculation equation, $$T = aV + b \tag{1}$$

and stores the resultant shaft torque T. Here, a, b are respectively constants of proportion and, values obtained through experimentation are previously written into a ROM 77 as the constants of proportion a, b.

Figure 9:
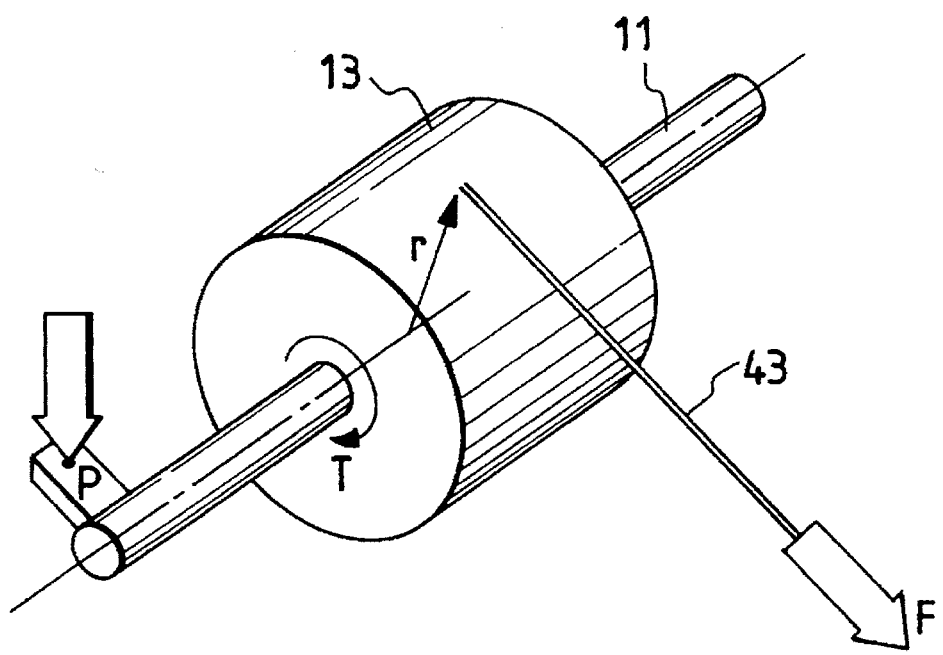
FIG. 9 is an explanatory view of a relationship between a shaft torque and a line tension.

On the other hand, as shown in FIG. 9, the shaft torque T, dynamically, can be obtained by multiplying a line tension F by a radius r of the line winding surface of the fishline 43 wound around the spool 13 (which is hereinafter referred to as a line winding radius). Therefore, in order to find the line tension F with the measured shaft torque T, the line winding radius r must be measured.

However, since the line winding radius r varies every moment according as the fishline 43 is played out or taken up, to find the line tension F by measuring the shaft torque T, it is necessary to measure the line winding radius r of the fishline 43 wound around the spool 13 every time it is taken up or played out.

While various means for measuring the line winding radius r on the spool 13 are available, in the fishing reel 33 according to the present embodiment, a line length measuring device is employed which is disclosed in Japanese Patent Publication No. 4-276510 of Heisei.

Describing this line length measuring device with reference to FIGS. 3 and 8, reference characters 79 and 81 respectively designates an ultrasonic transmitter and an ultrasonic receiver which are interposed between a support member 83 located in the rear portion of the reel main body 1 for serving as a thumb rest and a support member 87 onto which a mounting leg 85 can be mounted. As shown in FIG. 8, if a signal is input to a transmission circuit 89 from the microcomputer 69, then the transmission circuit 89 applies a pulse signal of a high voltage to the ultrasonic transmitter 79, so that the ultrasonic transmitter 79 can emit a pulse-shaped ultrasonic beam 91 onto the line winding surface of the spool 13.

And, as shown in FIG. 1, the ultrasonic receiver 81 is structured such that it can receive part of the ultranosic beam 91 reflected by the line winding surface of the spool 13. Also, in order that the ultrasonic beam 91 emitted from the ultrasonic transmitter 79 can be received by the ultrasonic receiver 81 in a good condition, the ultrasonic transmitter 79 and the ultrasonic receiver 81 are disposed such that they form a V arrangement with respect to the line winding surface of the spool 13.

If part of the ultrasonic beam 91 reflected by the line winding surface of the spool 13 is received by the ultrasonic receiver 81, then a transmission circuit 93 changes a signal to be applied to the microcomputer 69, for example, from 1 to 0. Also, the microcomputer 69 further incorporates therein a timer 95 which starts to count at the time point at which the signal is changed from 0 to 1, and measures a time difference t between the time point at which the signal is changed from 0 to 1 and the time point at which the signal is changed from 1 to 0.

And, since the speed v of the ultrasonic wave in the air is 331 m/sec., as shown in FIG. 8, a distance d to the line winding surface of the spool 13 can be calculated according to the following equation:

$$d = v \cdot t \cdot 0.5 \qquad (2)$$

Therefore, as shown in FIG. 5, when a distance between the ultrasonic transmitter 79 or receiver 81 and the spool shaft 11 of the spool 13 is expressed as c, then the line winding radius r can be found easily from the following equation:

$$r = c - d \qquad (3)$$

Also, in FIG. 8, 97 and 99 designate a pair of lead switches which are respectively mounted on the reel main body 1. And, 101 stands for a plurality of magnets which are fixed to the clutch side side surface 13a of the spool 13 in such a manner that they are disposed opposed to the lead switches 97 and 99. As disclosed in Japanese Patent Application No. 3-38671 of Heisei, when one of the lead switches 97 and 99 is turned on/off earlier than the other by the magnets 101, then a signal for the forward or reversed rotation of a spool 13 can be obtained. After that, if the spool forward or reversed rotation signal is input through an input interface 103 into the CPU 75, then an up/down counter 105 incorporated in the microcomputer 69 can be set into an up count state or a down count state. And, if a pulse for the rotation of the spool 13, which can be obtained by turning on/off of the lead switches 97 and 99, is input through the input interface 103 into the up/down counter 105, then the up/down counter 105 is allowed to count up or count down. Also, the LCD display device 39 is connected to an output interface 107 through a decoder 109.

And, the ROM 77 for storing the line length operation processing program and the line length calculation equation, RAM 73 for storing data such as the operation results obtained in the CPU 75 and the like, input interface 103, output interface 107, up/down counter 105, and timer 95 are respectively connected to the CPU 75 through a bus 111. Similarly to the prior art, from the actually measured value N of the rotation of the spool 13 obtained by the up/down counter 105 and the distance d calculated according to the above equation (2), a play-out line length L is calculated according to an operation equation, $$L = \pi \cdot d \cdot N \qquad (4)$$

and the operation result thereof can be displayed on the LCD display device 39 through the output interface 107 and decoder 109.

Therefore, the line tension measuring device according to the present embodiment is structured so as to find the line tension F by use of the line winding radius r obtained when the line length is measured in this manner.

That is, the fishing reel 33 according to the present embodiment is structured in the above-mentioned manner. Next, description will be given below of a line tension measuring operation with reference to a flow chart shown in FIG. 10.

Figure 10:
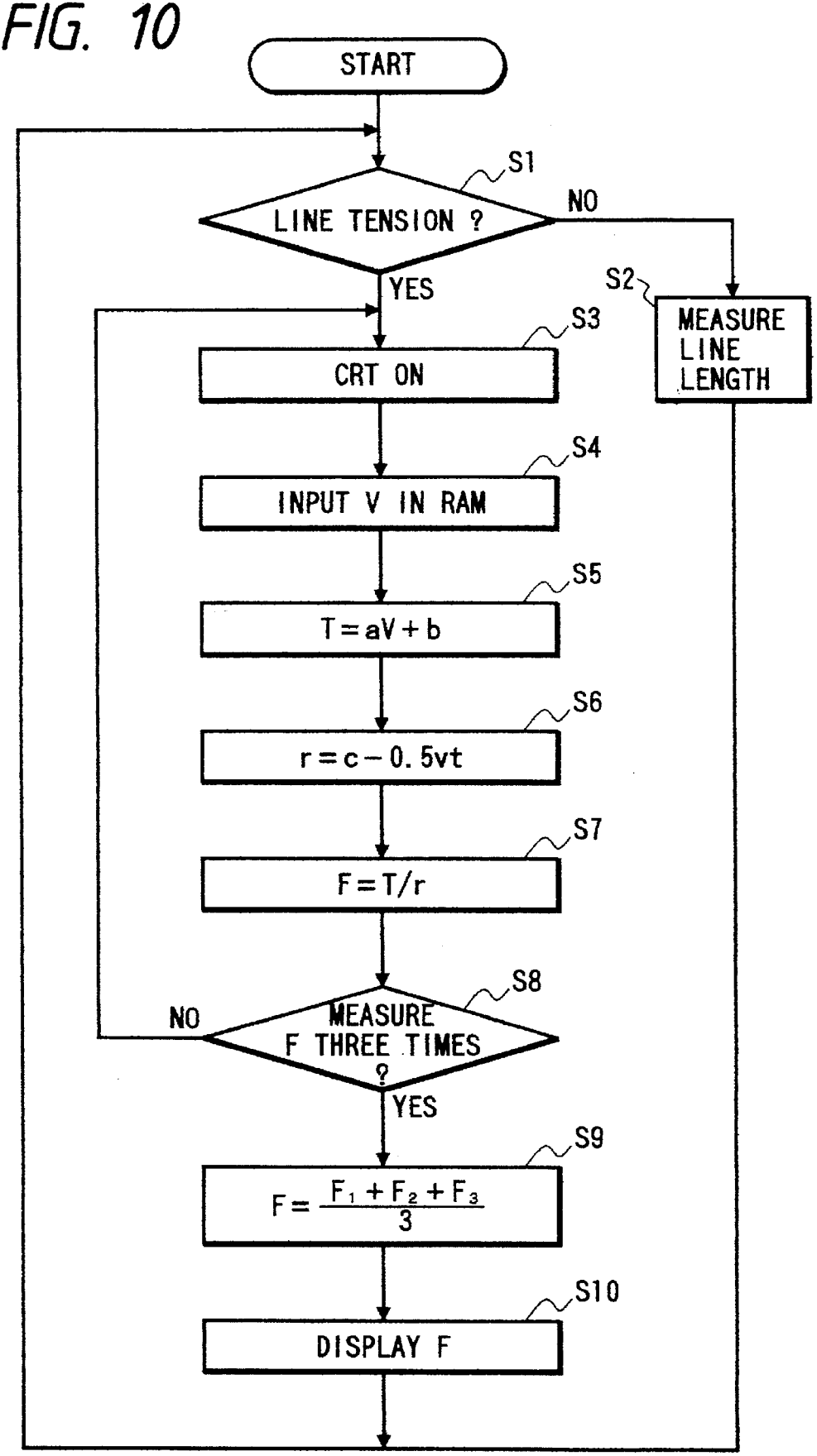
FIG. 10 is a flow chart of a line tension measuring operation to be performed by the present embodiment.

When a program shown in FIG. 10 starts, at first, in Step S1, it is checked whether a line tension display is requested or not.

In this case, if a line tension display switch 71 provided on the operation panel 70 is not operated yet, then the program advances to Step S2, in which, similarly to the prior art, the time required until the ultrasonic beam 91 transmitted from the ultrasonic transmitter 79 is received by the ultrasonic receiver 81 is measured, the measured time is converted into the line winding radius r to thereby measure the line length, and the measured line length L is then displayed on the LCD display device 39.

On the other hand, if it is judged in Step S1 that the line tension display is requested, or if the line tension display switch 71 is operated while the line length is being displayed in Step S2, then the program advances to Step S3. In Step S3, the microcomputer 69 turns on the power source of the oscillation circuit 55 to thereby close a circuit such as shown in FIGS. 5 and 7 between the oscillation circuit 55 and coil 53, so that an exciting current of 20 KHz is supplied to the coil 53. Thus, as shown in FIG. 5, a magnetic flux 200 of 20 KHz is allowed to pass through a magnetic path which is composed of the spool shaft 11, bearing 9 and yoke 51.

And, if the shaft torque T is applied to the spool shaft 11 and thus the magnetic thin bands 45 and 47 are strained due to stresses applied thereto, then variations in the magnetic permeabilities of the magnetic thin bands 45 and 47 caused by the change in the line tension appear between the output terminals 67 as a direct voltage V which is proportional to the intensity of the torque shaft T, so that the RAM 73 of the microcomputer 69 inputs and stores the output voltage V of the coil 53 therein (Step S4).

Next, in Step S5, the CPU 75 operates the shaft torque T according to the above-mentioned calculation equation T=aV+b and stores the resultant shaft torque T. During this operation, the line length measuring device is always in operation, that is, the line length measuring device is always measuring the time required until the ultrasonic beam 91 transmitted from the ultrasonic transmitter 79 is received by the ultrasonic receiver 81, while the CPUS 75 is converting the measured time into the line winding radius r according to the above-mentioned equations (2) and (3) to thereby operate the play-out line length L according to the above-mentioned equation (4). For this reason, the resultant line winding radius r is input into the RAM 73 (Step S6).

Here, as previously described, because of the shaft torque T=the line tension F×the line winding radius r, the line tension F [kg] is operated according to an operation equation, $$F=T/r \quad (5)$$

and the resultant line tension F is input and stored into the RAM 73.

And, in Step S8, the line tensions $F_1$, $F_2$ and $F_3$ are measured three times and, in Step S9, the average values of the line tensions $F_1$, $F_2$ and $F_3$ are calculated. After that, the line tension values are displayed on the LCD display device 39 (Step S10).

Therefore, if the angler looks at the display of the LCD display device 39, the angler can easily judge how great the current line tension F is.

For example, after the line tension F is displayed for three minutes by use of the timer 95, the processing goes back to Step S1, in which it is checked whether a line tension display switch 71 is operated or not. If not, then the processing moves to Step S2, in which the play-out line length L of the fishline 43 is displayed on the LCD display device 39.

Figure 11:
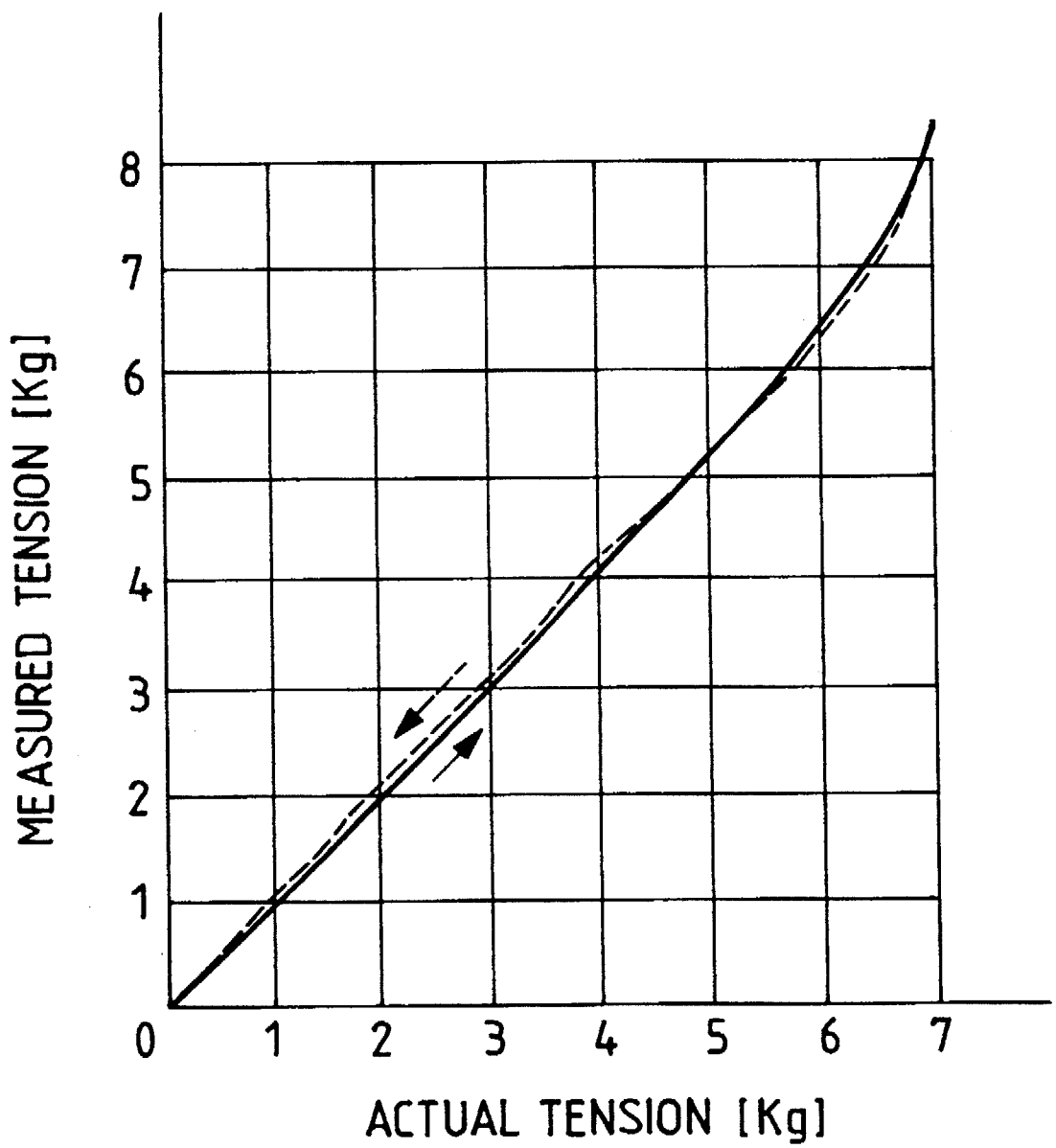
FIG. 11 is a graphical representation showing the actually measured values of the line tension of the fishing reel according to the present embodiment.

Now, FIG. 11 shows the actually measured values of the line tensions and the values read by the LCD display device, which values are obtained when the above-mentioned fishing reel 33 is fixed facing downward, a standard weight is suspended down from the top end of the fishline 43, and line tensions are given to the fishline 43. As can be seen from FIG. 11, when the line tension exceeds 5 kg, then there is produced a slight degree of error which can be neglected.

As has been described above, in the present embodiment, in order to obtain an induced voltage necessary to operate the circuit board 41, the clearance between the yoke 51 and spool shaft 11 is set for 0.15 mm. In order to make effective use of the narrow space, the conical coil storage portion 49 is formed in the clutch side side surface 13a of the spool 13. Likewise, the yoke 51 is formed in a conical shape so as to be able to obtain the necessary number of windings of the coil 53. The bearing 9 is formed of stainless steel which permits the passage of the magnetic flux therethrough and is added to part of the magnetic path to thereby be able to secure a wide storage space for the coil 53. The variations in the permeabilities of the magnetic thin bands 45 and 47 caused by the variations in the line tension are measured as the variations in the induced voltages of the coil 53, the measured values are converted into the line tensions and are then displayed on the LCD display device 39. Thanks to this, according to the invention, by looking at the display of the LCD display device 39, the angler can easily judge what a degree of line tension is actually acting on the fishline 43, with the result that the drag force can be adjusted within the allowable tension range of the fishline 43 to thereby reduce the possibility of the fishline 43 being cut.

Also, thanks to the fact that the angler is now allowed to recognize the line tension in this manner, even a beginner does not need to use a thick fishline which has been conventionally used, but can use and wind a thin fishline around a small-sized reel, which in turn improves convenience for use of the fishing rod.

In the present embodiment, in order to operate or calculate the line tension F from the above-mentioned operation equation (5), the line winding diameter data of the line length measuring device disclosed in Japanese Patent Publication No. 4-276510 of Heisei is found. However, the way of finding the line winding diameter is not limited to the above-mentioned embodiment. For example, as disclosed in Japanese Patent Publication No. 1-307612 of Heisei, there can be used a line length measuring device in which, by radiating a spot light onto the line winding surface of the spool to detect the position of the reflected light thereof by use of a position sensor, the line winding diameter of the spool is obtained and thus the play-out line length of the fishline is calculated from the thus obtained line winding diameter. A line winding diameter measuring means for measuring the line winding diameter of the spool variable according the play-out or take-up of the fishline can be selected arbitrarily.

As has been described heretofore, since the line tension measuring device is structured such that the line tension can be measured and the measured line tension value can be displayed on the display device, by looking at the display of the display device, the angler can easily judge what degree of line tension is actually acting on the fishline, with the result that the drag force can be adjusted within the allowable tension range of the fishline to thereby prevent the fishline from being cut while the angler is fighting against the fish.

Also, since the angler is now allowed to recognize the current line tension of the fishline, even the beginner does not need to use a rather thick fishline but can use and wind a thin fishline around the small-size reel, which improves convenience for use of the fishing reel.

Further, according to the fishing reel of the invention, when using the magnetostrictive torque sensor disclosed in Japanese Patent Publication No. 59-166827 in the fishing reel, the magnetic thin bands and coil can be made smaller and the smaller magnetic thin bands and coil can be incorporated into the fishing reel.

What is claimed is:

1. A fishing reel with a line tension measuring device for measuring fishline tension applied to a fishline wound onto a spool, said spool being rotatably supported on a reel main body through a spool shaft and braked by a drag force provided by a drag device, said line tension measuring device comprising:

a magnetostrictive torque sensor including:

a pair of magnetostrictive magnetic thin bands bonded to an outer periphery of said spool shaft for providing respective magnetic permeabilities varying according to torque caused on said spool shaft due to said fishline tension; and coil means, provided around said outer periphery of said spool shaft, for exciting said spool shaft by being supplied with a high frequency current from an oscillating circuit, to allow a magnetic flux to permeate therethrough, and detecting a difference between the magnetic permeabilities of said magnetostrictive magnetic thin bands, to thereby provide an induced voltage;

line winding diameter measuring means for measuring a line winding diameter of said fishline wound on said spool;

conversion means for converting said induced voltage into a calculated shaft torque;

operation means for providing a calculated fishline tension based on said calculated shaft torque obtained by said conversion means and said line winding diameter measured by said line winding diameter measuring means; and, a display device for displaying said calculated fishline tension obtained by said operation means.

2. A fishing reel as set forth in claim 1, further comprising:

a pair of bearings rotatably supporting said spool shaft on said reel main body, and located axially opposite from each other with respect to said spool, wherein at least one of said bearings, disposed adjacent to said thin bands, and said spool shaft are made of stainless steel.

3. A fishing reel as set forth in claim 1, wherein said spool defines a coil storage recess axially recessed into said spool along said spool shaft and substantially coaxial with respect to said spool shaft, and said coil means is installed within said coil storage recess.

4. A fishing reel as set forth in claim 3, wherein said coil means includes a yoke disposed within said coil storage recess and spaced from said outer periphery of said spool shaft with a slight clearance, said yoke having a shape in conformity with a shape of said coil storage recess.

5. A fishing reel as set forth in claim 3, wherein said coil storage recess is substantially conical.

6. A fishing reel as set forth in claim 1, further comprising:

a clutch mechanism disposed around said spool shaft for switching said spool between a fishline take-up state wherein said spool receives said drag force and a fishline play-out state wherein said spool is free from said drag force, said thin bands being located between said spool and said clutch mechanism.

7. A fishing reel as set forth in claim 1, wherein said thin bands are located substantially at a midpoint between a point corresponding to an axial center of said spool and a point at which a pinion fitted on said spool shaft meshes with a drive gear to which said drag force is applied.

* * * * *